United States Patent [19]

Skjaeveland

[11] Patent Number: 5,769,170
[45] Date of Patent: Jun. 23, 1998

[54] INTEGRATED SOIL CULTIVATING APPARATUS

[75] Inventor: Magne Skjaeveland, Klepp stasjon, Norway

[73] Assignee: Kverneland Klepp AS, Norway

[21] Appl. No.: 732,859

[22] Filed: Oct. 17, 1996

[30] Foreign Application Priority Data

Oct. 26, 1995 [GB] United Kingdom ............... 9521922
Jul. 17, 1996 [GB] United Kingdom ............... 9615034

[51] Int. Cl.[6] .................................................. A01C 5/00
[52] U.S. Cl. ........................................... 172/142; 111/52
[58] Field of Search ............................ 111/52, 134, 140, 111/144, 189, 902; 172/142, 145, 146, 311, 542

[56] References Cited

U.S. PATENT DOCUMENTS

| | | | |
|---|---|---|---|
| 1,278,795 | 9/1918 | Uhan | 172/142 X |
| 2,523,421 | 9/1950 | Buschor | 172/142 X |
| 2,981,213 | 4/1961 | O'Neil | 111/134 X |
| 3,055,322 | 9/1962 | Oehler et al. | 111/134 X |
| 3,982,773 | 9/1976 | Stufflebeam et al. | 172/456 X |
| 4,103,628 | 8/1978 | Gaston . | |
| 4,212,254 | 7/1980 | Zumbahlen | 172/142 X |
| 4,377,979 | 3/1983 | Peterson et al. | 111/134 X |
| 4,479,549 | 10/1984 | Fegley | 172/142 |
| 4,519,460 | 5/1985 | Gust . | |
| 4,533,000 | 8/1985 | Van Der Lely . | |
| 4,561,504 | 12/1985 | Anderson | 172/142 |
| 5,022,333 | 6/1991 | McClure et al. . | |

FOREIGN PATENT DOCUMENTS

| | | | |
|---|---|---|---|
| 0136165 | 4/1985 | European Pat. Off. | A01C 7/08 |
| 2009714 | 2/1970 | France | A01B 27/00 |
| 3340607 | 5/1985 | Germany | A01B 49/02 |
| 9407799 U | 7/1994 | Germany | A01B 49/00 |
| 1220516 | 1/1971 | United Kingdom | A01B 49/06 |
| 1552971 | 9/1979 | United Kingdom | A01B 33/06 |
| 1587736 | 4/1981 | United Kingdom | A01B 33/06 |
| 1589157 | 5/1981 | United Kingdom | A01B 49/02 |
| 2163932 | 3/1986 | United Kingdom | A01B 49/02 |

*Primary Examiner*—Michael J. Carone
*Assistant Examiner*—Robert Pezzuto
*Attorney, Agent, or Firm*—Sheridan Ross P.C.

[57] ABSTRACT

An integrated soil cultivation apparatus (20) which is coupled to the rear of a propelling vehicle (21) and can carry out a number of different soil working operations during forward movement, the apparatus comprising a frame; a coupling arrangement (2) at the forward end of the frame; a first packer (9) arranged to support the forward part of the frame (1); a second packer (11) arranged to support the rear part of the frame (1); depth adjustable levelling tines (8) arranged forwardly of the first packer (8); rows of transversely extending harrow tines (26 and 27) mounted on the frame (1) between the first and second packers (9 and 11); rear rows of tines (28, 29) preferably provided with coulter tubes for seed distribution; and a lowerable set of transport wheels (3) arranged to support the rear end of the frame (1) during transport only, but being raised out of contact with the ground so that soil cultivation can take place, whereby the first and second packers (9 and 11) carry out dual function of soil crumbling operations or packing of the loosened soil, and also being adjustably mounted on the frame (1), also control the working depth of the soil working implements.

13 Claims, 8 Drawing Sheets

INTEGRATED SOIL CULTIVATING APPARATUS

This invention relates to an integrated soil cultivating apparatus which is intended to be coupled to the rear of an agricultural tractor or other propelling vehicle, and to carry out a number of different soil-working operations so as to prepare a seedbed.

BACKGROUND TO INVENTION

It is known to use harrows to break-down previously ploughed soil, and which have harrow tines mounted on them and which are pulled through the ploughed soil so as to exert a working operation on the soil. The working operation loosens the soil structure, and also tends to break-down soil clods or clumps into smaller fragments.

It is also known to use so-called "packers", which comprise sets of discs or rings which are freely rotatable about a generally horizontal axis, and which are trailed behind a tractor after a ploughing operation. The rings are set into rotation by engagement with the ground, and exert a powerful working operation on the ploughed soil to break it down and to form a seedbed. Packers can be trailed behind a tractor in a separate operation, after ploughing has been completed, or can be "integrated" with a plough so that a combined ploughing and soil-working operation is carried out.

Harrows may use different types of tine to engage and to work the ground, and including so-called S-tines, and finger tines, and the shape and arrangement of the tines can be selected according to requirements.

It is also known to provide a "combination" implement (soil cultivator) which includes tine features of a harrow, plus additional soil-working tools, such as levelling boards, crumbler rollers, and studded rollers. These types of soil-working tools are well known to those of ordinary skill in the art, and need not be described in more detail herein.

One example of a combination type of cultivator is the Kverneland Combinator II, which is mounted on the rear linkage of a tractor, and can have up to six successive soil-working zones, namely a soil levelling board in zone 1 which begins the seedbed forming process and levels the soil, zone 2 which comprises two rows of strong S-shaped tines which loosen the soil to the desired depth, and the angle of which can be adjusted as required according to the nature of the soil; and zone 3 which comprises a heavy duty crumbler roller which crushes any clods left by the tines in zone 2. At the same time, the roller packs and levels the soil in preparation for the subsequent zones. Zone 4 comprises two further rows of S-shaped tines which carry out a final cultivating operation, to give a well prepared and level seedbed. Zone 5, and an optional zone 6, can comprise a combination of studded rollers and/or finger tine harrows which crush any remaining surface clods and lightly re-pack the soil.

Other examples of combination type cultivators include the Kverneland TTA trailed seedbed cultivator, and the Kverneland mounted TLA cultivator.

Combination type of soil cultivator implements operate generally satisfactorily, and the different types of soil-working tools which are provided, and their arrangement on the frame of the implement, will be selected to meet requirements, depending primarily upon the nature of the soil which is being worked.

However, although the combination type of soil cultivator works well in practice, there is an ever-present demand for still further improvements in seedbed preparation, and the present invention has been developed with a view to address this need.

Thus, in the preparation of a good seedbed i.e. one which allows uniform germination of seed, and healthy growth, the following objectives are highly desirable:

(a) a precise working depth of the soil-working tools to ensure correct planting depth, in that non-uniform planting of seed can result in variation in rate of germination, and in some cases failure of germination altogether;

(b) deposition or formation of coarser soil particles at the surface to give good oxygenation while protecting the soil against moisture loss and capping from rain damage;

(c) a layer of fine soil particles below the surface to form the basis of the seedbed, and to provide a good contact between the soil and individual seeds; and, (d) light compaction only of the seedbed to re-establish capillary action with the soil, enabling the seeds to absorb the necessary amount of water from the undisturbed soil below the seedbed in order to begin the germination process.

The invention is defined in its separate aspects, in claim 1 to 13 attached hereto.

Preferred embodiments of multi-tool type of soil cultivator according to the invention will now be described in detail, by way of example only, with reference to the accompanying drawings.

DESCRIPTION OF PREFERRED EMBODIMENT

Figure 1:
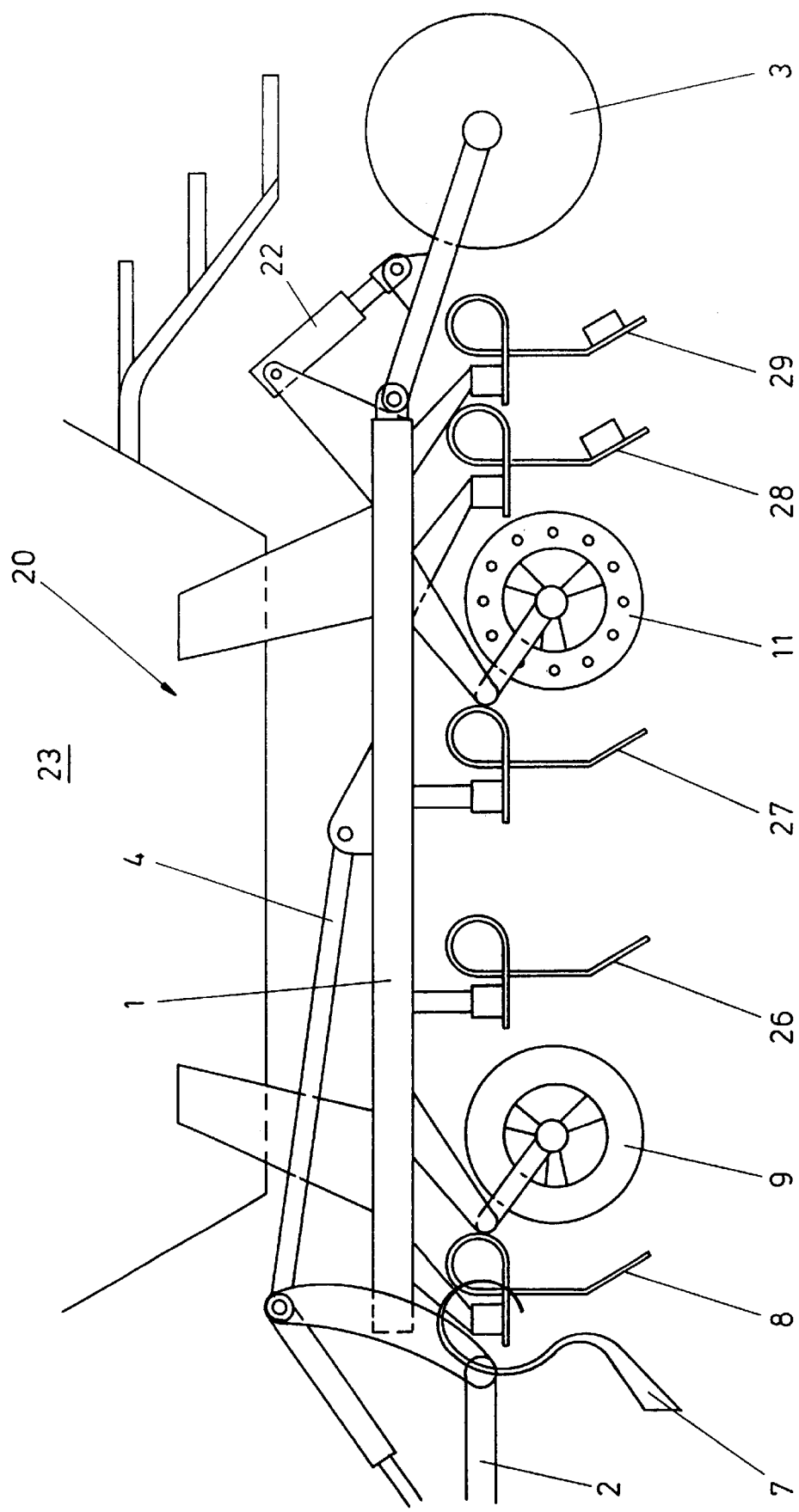
FIG. 1 is a schematic side view of a first embodiment of trailed seedbed cultivator according to the invention, having at least two different types of soil-working tool mounted thereon.
Figure 2:
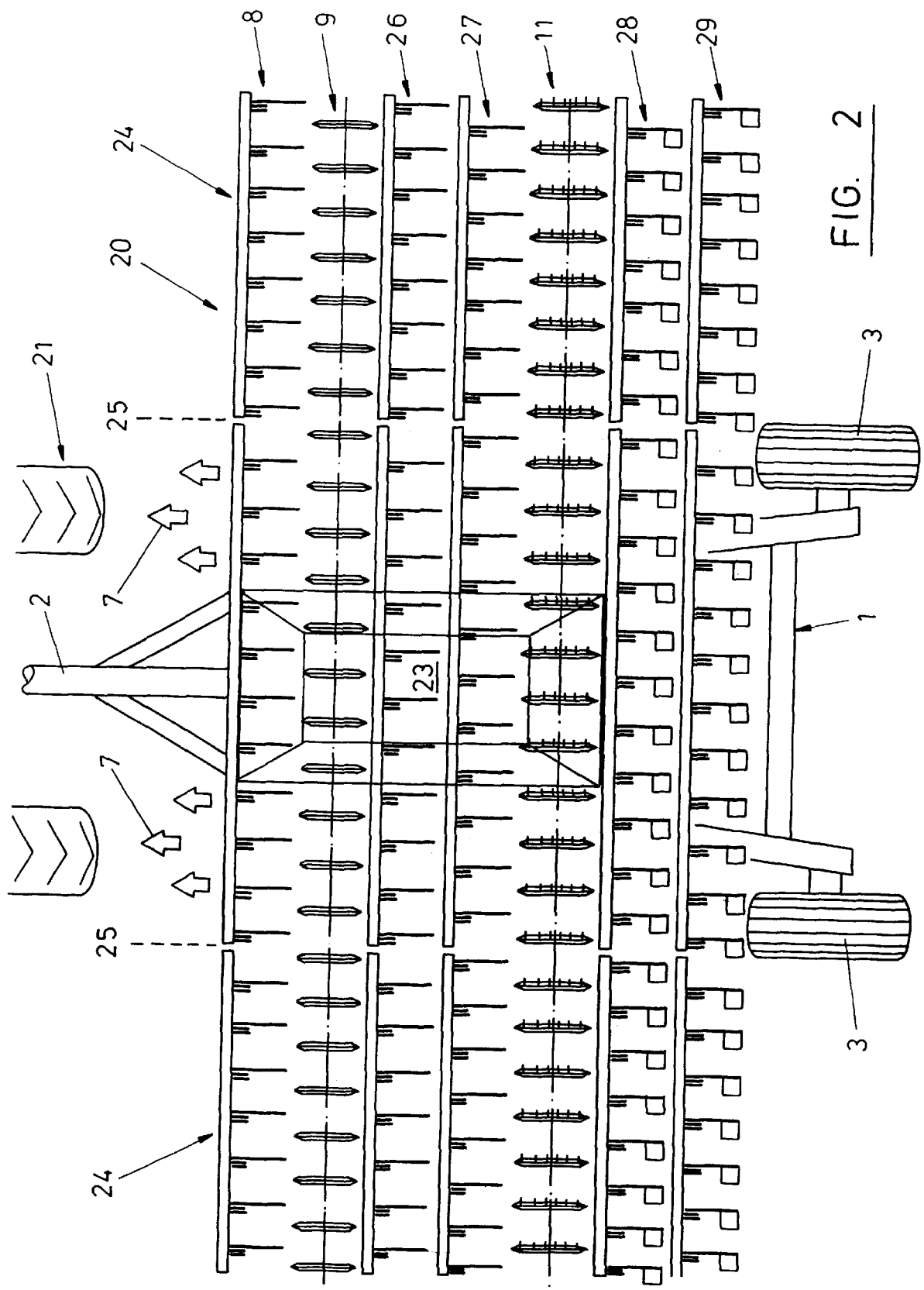
FIG. 2 is a diagrammatic plan view of the apparatus shown in FIG. 1.
Figure 3:
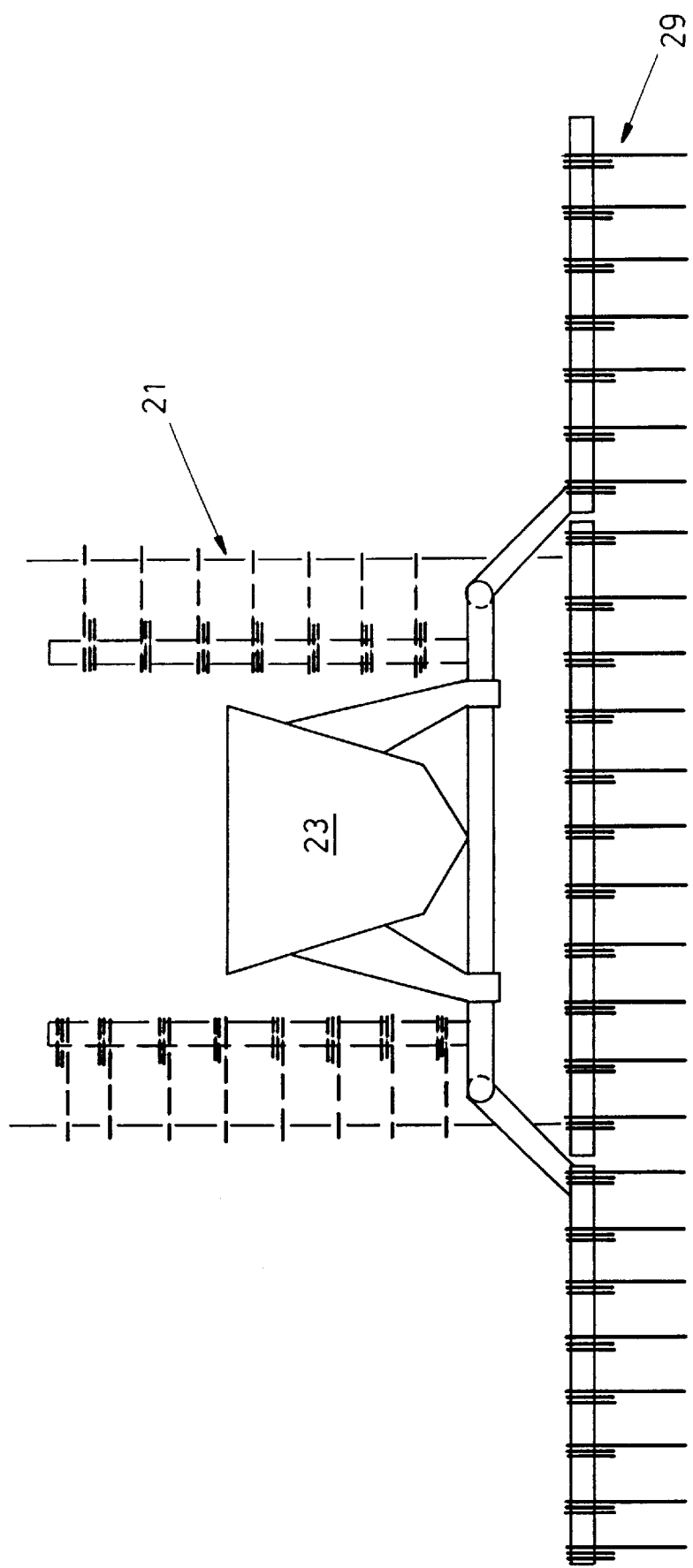
FIG. 3 is a diagrammatic rear view of part of the apparatus shown in FIGS. 1 and 2.

Referring now to FIGS. 1 to 3 of the drawings, there is shown, mainly by diagrammatic illustration, an embodiment of trailed integrated or combination type of soil cultivating apparatus according to the invention. The apparatus is designated generally by reference 20 and is intended to be coupled to the rear of a tractor or other propelling vehicle 21, and to carry out a number of different soil-working operations during forward movement of the apparatus 20 by the vehicle 21.

The apparatus 20 comprises a main frame 1, and which usually will have a length of about 3 meters, in order to mount the number of rows of soil-working tools which are required to be mounted on the frame 1, and spaced apart from each other along its length i.e. spaced apart from each other with respect to in the direction of forward travel of the apparatus. A coupling arrangement is provided at the forward end of the frame 1, to couple the apparatus to the rear of the vehicle 21, and in the illustrated arrangement is shown schematically by a drawbar 2.

The width of the apparatus 20, in its operative mode, will be selected according to the required area of ploughed ground which is required to be cultivated during each pass of the apparatus, and it might have a width (measured in the direction perpendicular to the direction of forward travel) in the range 3 meters up to 9 meters, and in a typical example a width of about 7 meters. However, since it will be quite impractical to transport an apparatus of width 7 meters (in its operative mode), at least one, and preferably a pair of foldable "wings" is pivotally connected to the sides of a central part of the frame, and which can pivot between a substantially horizontal and operative position, as shown in FIG. 2, and an upwardly and slightly inwardly folded transport position of much reduced overall width, whereby the apparatus 20 can be towed through a gateway or other entrance to a field, and along the public highway. However, a smaller version of the apparatus might have an operative width of about 3 meters, in which case folding to a transport position may not be necessary.

During transport of the apparatus 20, the forward end of the apparatus is supported by the drawbar 2 and its coupling to a rear hitch of the vehicle 21, whereas the rear part of the frame 1 is supported by a pair of vertically adjustable transport wheels 3. The wheels 3 can be vertically adjusted by hydraulic rams 22, or other power or manually operated adjustment devices. It should be understood that the wheels 3 are required only for the purposes of wheeled transport of the apparatus 20, and that the wheels will be raised completely out of contact with the ground during soil cultivating operations. The wheels 3 are therefore the only wheels used to support the apparatus, and then only during transport. There are no other wheels provided to support the apparatus, and it follows therefore that there are no wheels provided for depth control purposes during soil cultivating operation.

As will be described in more detail below, depth control during operation is controlled by one or more roller-type of packer, (comprising a set of packer discs or rings as well known to those of ordinary skill in the art).

The general frame 1 of the apparatus therefore can be raised, relative to the ground, when the ground wheels 3 are lowered into ground contact, whereas the frame 1 is lowered to a working position when the wheels 3 are raised out of contact with the ground. In order to maintain the attitude of the frame 1 generally parallel to the ground surface, during this upward and downward adjustment, an automatically operating adjustment mechanism 4 is provided. Mechanism 4 comprises pivoted linkages coupled with the frame 1 and operative to maintain a generally parallel attitude of the frame 1 during height adjustment. The mechanism 4 is only shown diagrammatically, but could be as shown in e.g. the adjusting mechanism disclosed in EPA 9410000.9.

The apparatus 20 is primarily a multi-tool soil cultivation apparatus, but a particularly preferred additional feature applied to the apparatus is the provision of a seed distribution system, which is "integrated" with the apparatus, and which is capable of distributing seed at required planting depth in the seedbed formed by the apparatus. The seed distribution system is not shown in detail in the drawings, but will include a supply tank, an air driven distribution system which receives seed from the tank, and distributes it along distribution pipes to rear mounted "coulters" which introduce the seed at the required planting depth into the seedbed which has been formed by the preceding soil cultivation tools.

As indicated above, the seed distribution system is not shown in the drawings in detail, but there is schematic illustration of seed tank 23, which is mounted on a central part of the main frame 1, and which is long, but relatively narrow, so as to allow upward and inward folding of a pair of side frame wings 24 of the apparatus, which can fold upwardly about longitudinal side pivot axes 25 of the main central part of the frame 1, to take-up the transport position.

Returning now to description of the soil cultivating tools mounted on the frame of the apparatus, a number of separate rows of harrow tines are mounted on the frame, and comprise in particular a forward row of "levelling" tines 8 (which will be described in more detail below), an intermediate pair of rows of tines 26 and 27, and a rearward pair of rows of tines 28 and 29, and which incorporate "coulters" at their lower ends for the purposes of seed distribution at required planting depths. Preferably, track looseners 7 are mounted in front of the tines of the foremost row 8, as shown schematically in FIGS. 1 and 2.

In addition to the rows of tines, the frame of the apparatus also has mounted thereon a packer 9 comprising a set of axially spaced packer discs or rings, mounted behind the foremost row of tines 8, and there is also a further packer 11, composed of sets of spaced packer discs, and which is arranged between the rows 27 and 28.

FIG. 2 is a diagrammatic plan view of the soil-working tools of the apparatus, and FIG. 1 is a schematic side view. It can be seen in particular from the side view of FIG. 1 that the tines in each of the rows 8, 26, 27 and 28 are of the same design, and the design of the tine (10) is shown in more detail in FIGS. 4 and 5. Essentially, the tines are of circular cross-section, and similar to "finger tines" used on a harrow.

The foremost row 8 of tines comprise hydraulically adjustable "levelling tines", whose depth can be adjusted, and which are capable of carrying out a preliminary soil-working action, and which replaces the action normally provided by a known forwardly mounting "levelling board". The use of a so-called levelling board is known to those of ordinary skill in the art, to level the soil and to crush clods. While levelling boards are used widely, and are generally found to be satisfactory, it is a matter of practical experience that under certain soil conditions, stones and clods of a certain size can pass under the levelling board, and by this action tend to apply an upward force to the levelling board, and which tends to lift the entire apparatus. Obviously, this upward movement of the levelling board is undesirable, since it raises the following soil-working tools so that their depth of penetration into the soil is less, and therefore the required depth of seedbed is not formed at this particular location, when the levelling board has been upwardly displaced. However, by replacing the levelling board with so-called "levelling tines", which is a unique and inventive concept in soil cultivation apparatus, it has been found that the tines can break-up the soil and also push a suitable amount of the soil in front of each tine, so that the ground surface is levelled to a certain extent. The tines are spaced apart from each other along the row 8 to any required extent, and by suitable vertical adjustment, required soil cultivation, and also levelling function can be obtained, which is comparable to that obtained by known forwardly mounted levelling boards, but without the disadvantage of stones or clods being able to apply upward displacement to the frame.

The operation of the tines, as they move through the already worked ground, is somewhat similar to the movement which would take place of a comb moving through fine sand. If the spacing apart of the teeth of the comb should be quite large, when moving through sand, each tooth tends to work alone, and to produce a small pile of sand only in front of each tooth. The sand which faces the gap between each pair of teeth tends to move straight through this gap, without much interference from the piles of sand in front of each tooth. However, if the teeth of the comb should be arranged closer together, as the comb moves through the sand, each tooth interacts with the neighbouring teeth on either side, to generate a wave, and therefore a substantially continuous pile of sand is formed (in the wave) in front of the entire comb, and not just small piles of sand in front of each tooth.

The arrangement of the tines in the first row 8 is made so as to simulate this movement of a comb through sand having closely spaced teeth, and which will be determined by experiment, according to different soil conditions, to achieve the required piling up of soil material in advance of the tines in the row 8. By adjusting the depth of the tines, and the lateral spacing to suit soil conditions, a wave-like form of reserve soil can be formed in front of the tines in the row 8, and when bumps in the ground are encountered by the tines, they are scraped-off, and absorbed in the "wave", and such material is able to fill any recesses which are present in the ground. The "wave-like" formation of soil in front of the tines 8 provides a soil levelling function, in a unique arrangement, and which thereby allows the row 8 to function as "levelling tines", and to replace the function previously provided by known levelling board arrangements.

Figures 4, 5:
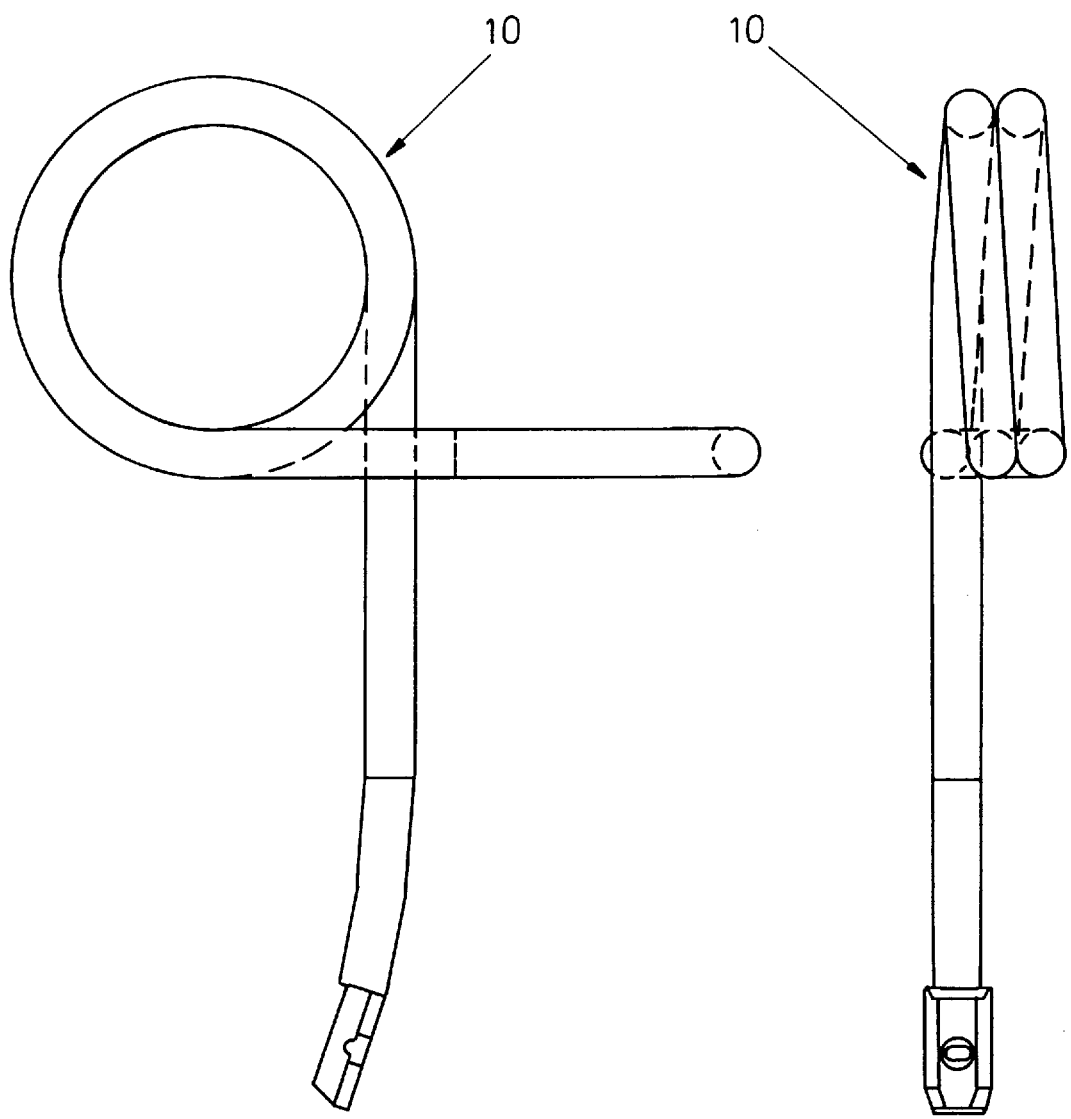
FIG. 4 is a side view of a finger-type harrow tine for mounting on the frame of the apparatus shown in FIGS. 1 to 3.
FIG. 5 is an end view of the tine shown in FIG. 4.

As indicated above, the tines in the rows 8, 26, 27, 28 and 29, are preferably all made to the design shown in FIGS. 4 and 5 i.e. of circular cross section, and comprising substantially vertically extending fingers which project downwardly into the previously ploughed soil. This design of the tines is advantageous, and especially when compared with known designs of tine which are of rectangular cross-section, which are relatively flexible in the working direction, but much more resistant to deformation in the lateral direction. A disadvantage of use of rectangular cross section tines has been that, when the soil is hard and/or stoney, they are able to yield resiliently backwards and upwardly, with the result that the required working depth is no longer maintained. Furthermore, the rectangular section tines tend, via their lower tips, to bring sub-surface stones up to the surface, and hard soil tends to be broken-up into large lumps, that are very difficult to crumble afterwards by following soil-working tools. Furthermore, because the rectangular section tines are relatively rigid in the lateral direction, they have to be spaced apart laterally from each other by a sufficient distance to allow most stones to pass between them, and this therefore leaves a substantial area of unworked soil in the space between adjacent tines.

By contrast with the known rectangular section tines, the use of the circular cross-section tines of the design shown in FIGS. 4 and 5, have a number of technical advantages. First of all, they have substantial thickness i.e. a large diameter, so that they are sufficiently strong, and therefore can function better than both the rectangular cross-section tines, and also known S-shaped tines. Furthermore, the tine designs of FIGS. 4 and 5 are preferably forged at their tips, and therefore it is possible to fit them with replaceable wearing parts, and other parts as coulter units (see rearmost rows 28 and 29). In particular, the following advantages can be derived by the new design of tines shown in FIGS. 4 and 5:

1. Since the tines point more or less directly downwards, the tip of each tine moves in a generally horizontal plane, and is less liable to be deflected upwardly than the known tines. The bottom surface of the crumbled soil layer will therefore become more even.

2. Since the point is pointing down, and also slightly backwards, (when undeformed), it does tend to deflect rearwardly to a small extent, as it is forced through the soil, and this is less liable to bring stones and large lumps up to the surface, and is more likely to press any stones present in the soil downwardly, and also to press downwardly onto the top of any lumps so that they are crushed;

3. Since the new tines are equally flexible in all directions, and much more flexible than the previous tines in the lateral sense (the rectangular section tines), they can be positioned closer to each other. Even if large stones are encountered, they are able to pass between an adjacent pair of tines because of the lateral flexibility given to the tines. This would be the case, assuming that such stones have not in fact been pressed further downwardly into the ground by engagement of the tines with the stones below the surface. Therefore, it has been found that a soil cultivator can operate as well with three rows of the new tines, compared with existing harrows with the other designs of tines which might have five rows of tines. Even two rows of this new design of tine have a satisfactory soil cultivating action, and although the illustrated embodiment has five rows of tines, the additional three rows have other functions in addition to operating as a soil cultivator. By this means, the overall length of the apparatus can be kept reasonably short, when compared with existing designs, and still carry out an acceptable soil-working operation.

Turning now to the packers 9 and 11, it is believed to be unique to employ at least one packer as an integral component part of a harrow type of soil cultivator, and the forwardly mounted packer 9 has a dual function. It is manually depth adjustable, and incorporates spring-loaded packer rings, which are capable of crushing clods to break them down, and also of "packing" the soil. However, in addition to carrying out a "packing" function, the packer 9 also serves to provide for depth control of the forward part of the apparatus. The packer discs therefore perform the dual function of carrying out soil-working (packing), but also depth control, and this is an important aspect in the preparation of a seedbed, namely that the soil should be worked and cultivated, and crumbled down to the depth at which the seed is to be introduced. It is important, as far as possible, to keep the cultivation depth substantially constant, so that upon subsequent introduction of seed, this can be into substantially uniform seedbed conditions, and to substantially constant planting depth, so as to obtain as even germination as possible.

The discs or rings of the packer 9 can be of simple disc or ring form, as shown schematically in FIG. 2, whereas the rearward packer 11 may comprise axially spaced discs provided with additional soil-working elements e.g. projecting knobs or projections, to assist in the crushing of any remaining clods formed during the soil-working operations of the preceding soil-working tools.

The packer 11 is also manually adjustable as to its depth, for the purposes of providing depth control of the rear part of the apparatus. The rings of packer 11 also are spring-loaded, to assist the soil-working operation.

Finally, as mentioned above, the two rearmost rows 28 and 29 also comprise manually height adjustable tines, but provided with coulters at their lower ends for the purposes of introducing seed at required planting depth into the seedbed. This arrangement of coulters is preferred, in apparatus according to the invention, although the present invention does include the possibility of using existing designs of coulter arms at the rear of the apparatus. However, when soil conditions are heavy, the existing designs of coulter arms are liable to be pressed upwardly by the presence of any residual clods or stones, due to the lack of strength of the arms and their mountings, and this raises the actual planting depth of the seed above the require planting depth, which may result in uneven germination, or even no germination at all. Indeed, with existing coulter arms, the action of stones and clods can be such as to displace the seed distribution tip up to the ground surface, and with pressure air delivery of seed, this can result in the seed being blown away over the surface, and not to be distributed into the ground at all. By contrast, with the new design of tine, shown in FIGS. 4 and 5, plus a "coulter" at its tip, the tine is much stiffer than an existing coulter arm, and therefore is better able to stay in the soil at or around the required depth, giving improved distribution of seed into the seedbed formed by the preceding tools of the apparatus.

Figure 6:
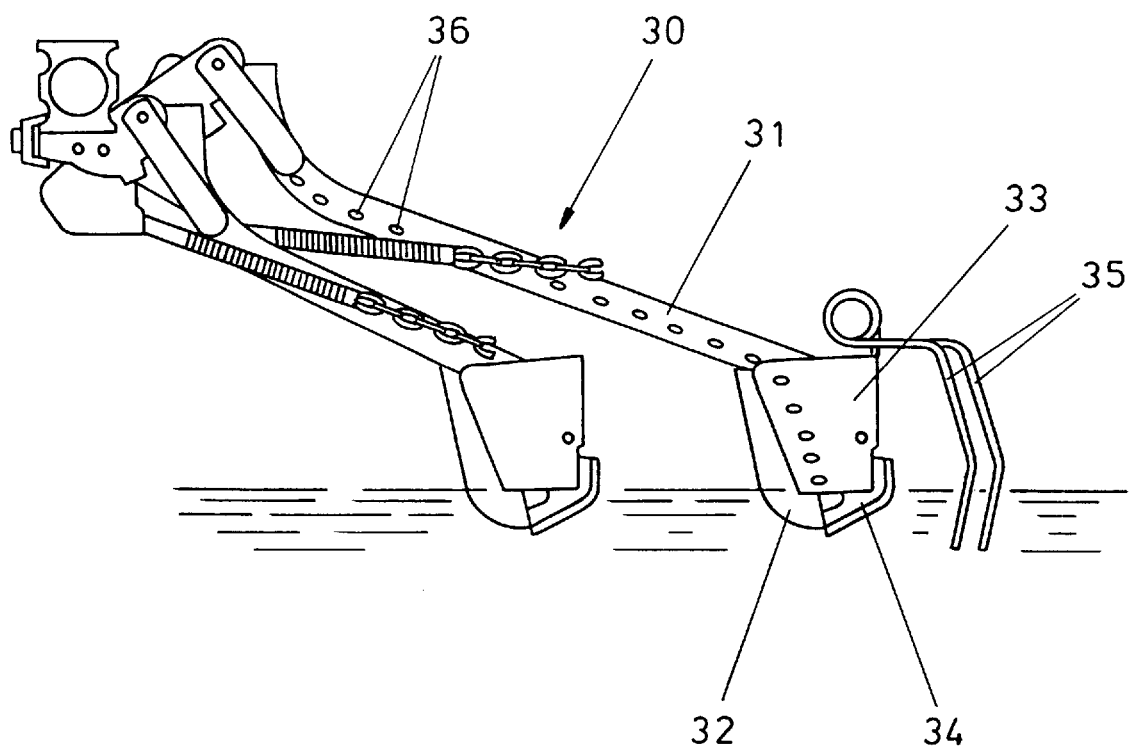
FIG. 6 is a side view of an existing design of coulter, parts of which can be incorporated into the rearmost rows of tines of the cultivator.

FIG. 6 of the drawings shows a typical existing design of coulter, and which is designated generally by reference 30, and which comprises a coulter tube 31, an opening piece 32, guide plates 33, a hinged lid 34 and tine fingers 35. Seed 36 is fed along the coulter tube 31, and opening piece 32 opens the furrow into which the seeds are guided by the guide plates 34. Hinged lid 34 protects the outlet against clogging, and opens up for the outlet as the coulter is moved through the soil. The tine fingers 35 smooth the surface of the soil so as to cover over the furrows in which the seed is deposited.

This description of existing design of coulter, with reference to FIG. 6, is intended to provide background to one example of a way in which the tines 10 can be modified so as to incorporate a coulter function, in respect of the tines in the rows 28 and/or 29. A modified version of the guide plates 33 will be secured to the ends of the tines 10, instead of the existing point, and the rigid coulter tube is then made to extend upwards for only a short length. The connection to a suitable seed distributor comprises a flexible tube, as will be well known to those of ordinary skill in the art. Therefore, the function of the opening piece 32 of the existing coulter is taken over by the tine 10, and the hinged lid 34 and tine fingers 35 are no longer required, because of this incorporation of the coulter function into the ends of the tine.

Figure 7:
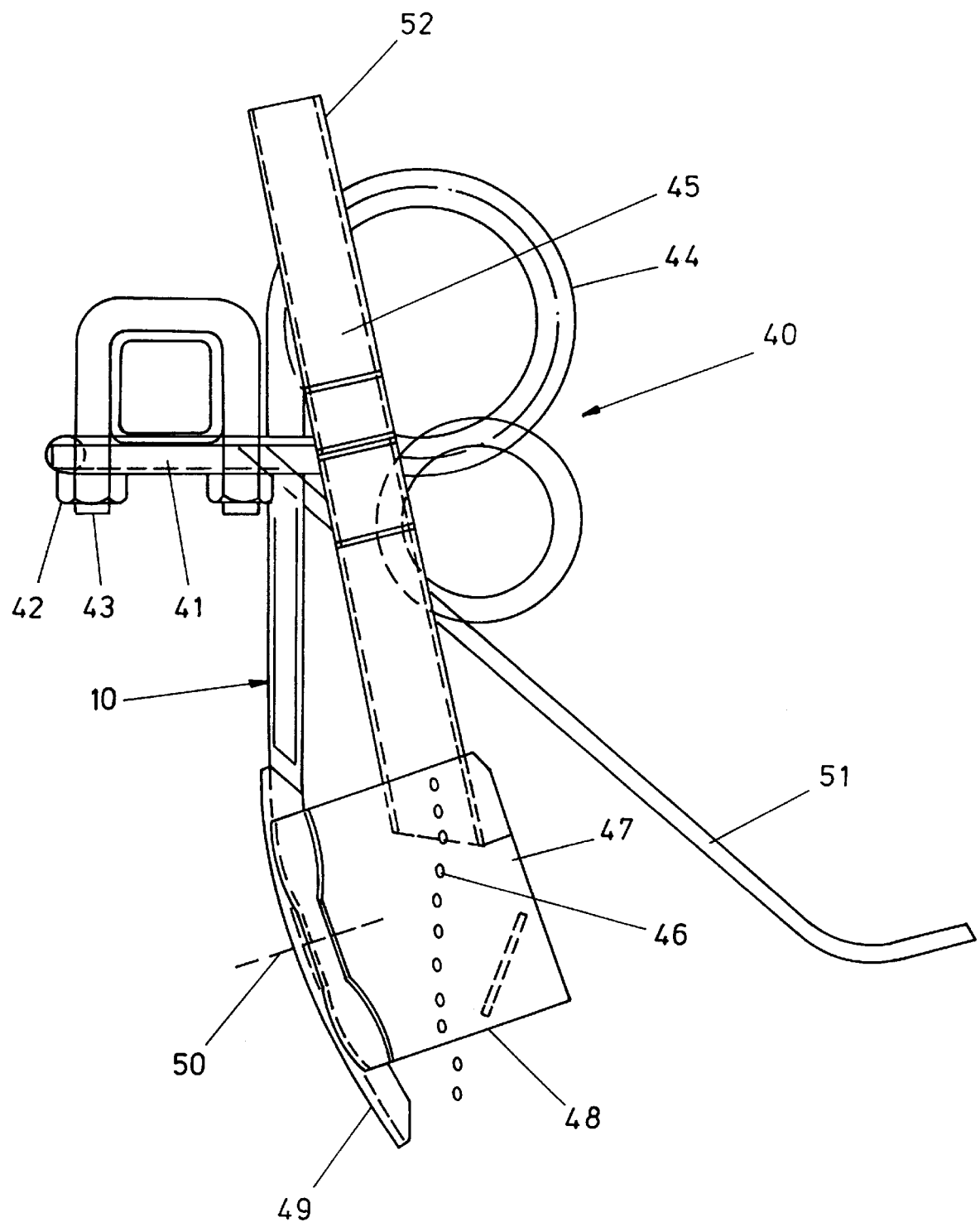
FIG. 7 is a side view of a harrow-type tine integrated into a seed and/or fertiliser distributing coulter; and, FIG. 8 is a schematic side view of a second embodiment of the invention which is capable of being fully mounted on the usual 3 link lifting mechanism of a tractor.

One preferred example of incorporation of a harrow-type tine into a seed and/or fertiliser distributing coulter is shown in FIG. 7, to which reference will now be made. As will be described in more detail below, with reference to FIGS. 1a and 7, at least some of the rows of harrow-type tines may be incorporated into seed distribution coulters i.e. in the two rearmost rows 28 and 29, but in addition the row of tines 27 immediately ahead of the rearmost packer 11 may be incorporated into a fertiliser distributing coulter. The design of coulter shown in FIG. 7 may be utilised for all of these arrangements, although in the case of fertiliser distribution, it will be highly desirable for the depth of the introducer tip of the coulter to be located deeper than the introducer tips of the seed distributing coulters. Furthermore, desirably each fertiliser distributing coulter is arranged approximately midway between a trailing pair of seed distributing coulters.

The coulter shown in FIG. 7 is designated generally by reference 40 and incorporates circular cross section harrowtype tine 10 supported at its upper end via a mounting platform 41, to which it is secured by nuts 42 and threads 43, and the downwardly projecting portion of the tine 10 is maintained in this upright position, but is capable of being deformed longitudinally i.e. in the direction of travel against resilient opposition provided by coils 44.

A rigid tube 45 distributes seed, (or fertiliser) 46 to a closed box 47 having a lower outlet 48. The box 47 is secured via its front face to a tine "point" 49, which is removably attached to the lower end of the tine 10 via fixing bolt 50. Flexible fingers 51 project downwardly and rearwardly from the platform 41, and are generally equivalent in function to the fingers 35 of standard coulter design shown in FIG. 6.

FIG. 7 shows by reference 46 seed or solid fertiliser, by way of example only. It should be understood that the distribution system can readily be modified to discharge doses of liquid fertiliser, if required. A flexible supply tube (not shown) is coupled to the upper end 52 of rigid tube 45, and leads to any suitable reservoir containing the seeds and fertiliser as appropriate.

Desirably, a seed tank or reservoir is carried by the frame of the implement, whereas the fertiliser tank or reservoir preferably is carried at a suitable mounting point on the tractor.

During normal operation of the soil cultivation apparatus as described and illustrated herein, it will be possible to carry out both soil cultivation and seed drilling at the same time. However, if any ground conditions should happen to be so hard and severe that it is unsuitable for seed drilling during the first pass, it is possible to shut-off the supply of seed to the coulters, and to carry out soil cultivation over any particular severe part of the field more than once, until the soil condition and the seedbed formation is satisfactory for drilling. The feed of seed can then be renewed. However, evidently when the coulters are not supplied with seed, the tines of the rows 28 and 29 function solely as soil cultivation tools.

As discussed above, in relation to the coulter of FIG. 7, the apparatus may be modified so as to be capable, not only of distributing seed simultaneously with the soil cultivating operations, but also of distributing fertiliser at the same time. One means whereby this may be achieved is shown in FIG. 1a, to which reference will now be made.

Figure 1A:
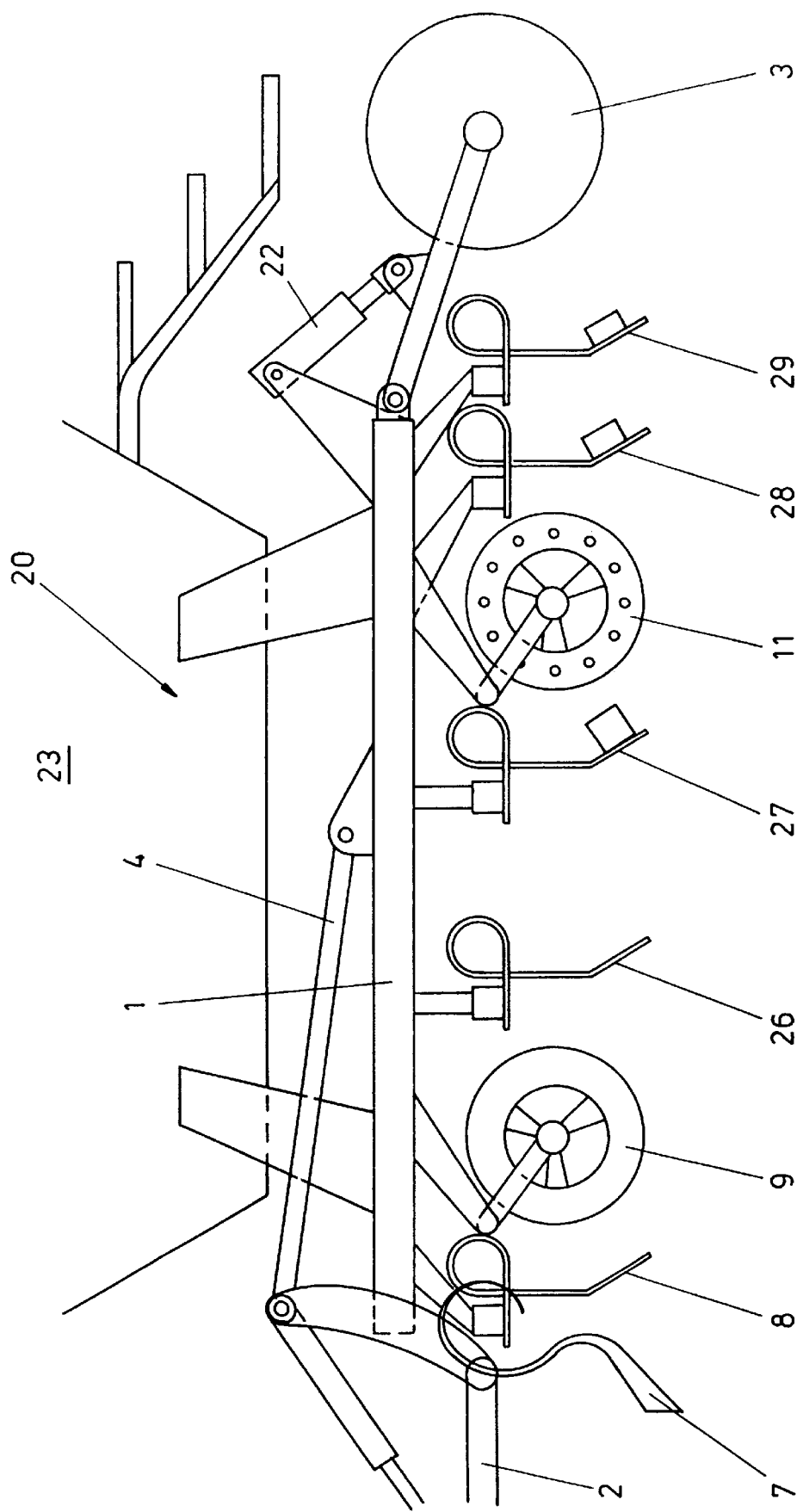
FIG. 1a is a view, similar to FIG. 1, of a preferred development of the first embodiment.

FIG. 1a is a modified development of the embodiment of FIG. 1, and corresponding parts are given the same reference numerals, and will not be described in detail again. The rows of tines 28 and 29, which are arranged immediately downstream of the rearmost packer 11, are incorporated into seed distributing coulters. Immediately upstream of the rearmost packer 11, the rows of tines 27 are incorporated into fertiliser distributing coulters. The fertilising distributing coulters may be used to distribute solid fertiliser in powder or pellet form, or to distribute liquid fertiliser if required.

FIG. 1a is only a schematic illustration, and in practice it will be preferable that the lowermost distributing point of the fertiliser coulter will be located deeper into the ground than the corresponding tip of the seed distributing coulters. Furthermore, although not shown, as viewed in plan, each of the fertiliser coulters will be located approximately mid-way between the lines of two following seed distributing coulters. By introducing the fertiliser to a greater depth, this allows the seed to be introduced at a slightly higher level in the ground, and with the desired distribution of coarse and fine soil particles, and the seed can readily germinate and grow downwardly via its roots to a certain extent, before coming into contact with the fertiliser. This gives very efficient usage of the fertiliser, (in practice the use of fertiliser is not particularly beneficial until such time as the root system has developed, and indeed close proximity of fertiliser to an ungerminated, and then gradually germinating seed can be harmful). The lower depth of the fertiliser allows the seed to germinate, and to grow, before coming into contact with the fertiliser, and which it then utilises to maximum effect.

Returning now to the description of the first embodiment of FIGS. 1 to 3, in general terms, it will be apparent that this is a trailed machine, in the sense that its forward end is connected to a draw-bar, and in the transport mode the rear end of the apparatus is supported by the lowerable transport wheels 3. However, in the soil-cultivating mode, the transport wheels 3 are raised, and the forward packer 9 supports the forward end of the apparatus frame 1, and the rear packer 11 supports the rear end of the frame 1.

The forward and rearward packers 9 and 11 respectively therefore perform dual functions, namely they extend full width across the frame of the machine i.e. perpendicular to the direction of travel, so as to carry out soil-working operations i.e. "packing" of the loosened soil, and in addition serve to control the working depth of the other soil working components (tines, coulters etc) of the apparatus.

However, the invention is not restricted to trailed machines, but includes the alternative of semi-mounted and fully-mounted machines.

An alternative embodiment is shown in FIG. 7 of the drawings, and in which parts corresponding with those already described are given the same reference numerals, and will not be described in detail again. The main difference is that the forward packer 9 is omitted, and therefore it is necessary to provide alternative vertical support for the forward end of the apparatus frame 1 in the operative position. The forward end 53 of the frame 1 is therefore adapted so as to be capable of being "fully mounted" on the usual top link and two lower links of a rear-mounted tractor lift mechanism. A headstock 54 is therefore mounted rigidly at the forward end 53 of frame 1, and its upper pivot end 55 is connected to tractor top link 56, whereas the pair of laterally spaced lower pivots 57 are each joined to a respective one of the pair of lower links 58.

The entire apparatus therefore can be raised to a transport position, by operation of the lift mechanism, for transport purposes and general manoeuvring, but when soil working operations are required, the forward end 53 of the frame 1 is lowered to a required height above the ground, and inclination of the axis of the frame 1, so that the sole packer 11 in this embodiment serves to assist in determining the working depth of the apparatus (in conjunction with the front mounted support via the lift mechanism), as well as carrying out soil crumbling or "packing" operations.

Figure 8:
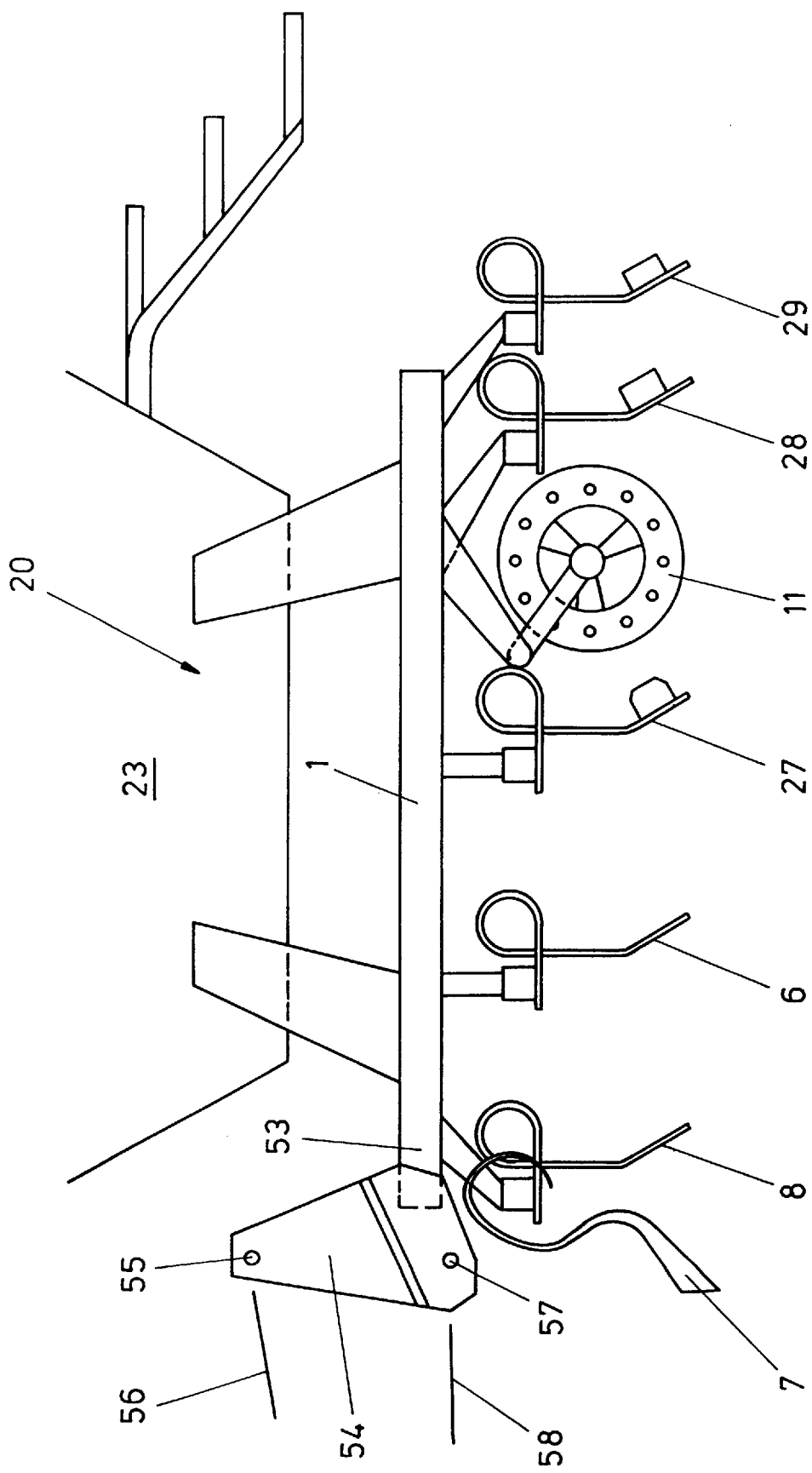

FIG. 8 also shows the preferred development which has been described with reference to FIG. 1a, namely in which the rows of tines 27 are incorporated into fertiliser distributing coulters. This is a preferred development of this embodiment also, although it should be understood that the tines 27 may function solely as harrow type tines, or as coulters.

I claim:

1. An integrated soil cultivation apparatus which is intended to be coupled to the rear of a propelling vehicle and to carry out a number of different soil-working operations during forward movement of the apparatus by the vehicle, said apparatus comprising:

a frame;

a coupling arrangement at the forward end of the frame to couple the apparatus to the rear of the propelling vehicle;

transversely extending rows of harrow tines mounted on the frame;

a rotatable soil packer mounted on the frame and having axially spaced packer elements extending generally parallel to the rows of harrow tines, said packer being adjustable relative to the frame so that the engagement of the packer with the ground controls the working depth of the harrow tines; and a transversely extending row of seed coulters mounted on the frame rearwardly of the soil packer.

2. An integrated soil cultivation apparatus which is intended to be coupled to the rear of a propelling vehicle to carry out a number of different soil-working operations during forward movement of the apparatus by the vehicle, said apparatus comprising:

a frame;

a coupling arrangement at the forward end of the frame to couple the apparatus to the rear of the propelling vehicle;

a first soil working device mounted on the frame and having rotatable axially spaced soil working elements extending transversely of the direction of forward travel, said device being engageable with the ground in order to carry out soil working operations, and also being adjustable relative to the frame so as to support the forward end of the apparatus and thereby control the working depth of the apparatus;

at least one row of transversely extending harrow tines mounted on the frame rearwardly of the first soil preparation device; and a second soil working device mounted on the frame rearwardly of the row of harrow tines, and having rotatable axially spaced soil working elements extending transversely of the direction of forward travel, said second soil working device being adjustable relative to the frame so that the engagement of said second device with the ground supports the rear end of the frame and thereby further controls the working depth of the apparatus.

3. Apparatus according to claim 1, in which the coupling arrangement comprises a draw bar which can be coupled to the rear hitch of the propelling vehicle, to form a trailed apparatus.

4. An integrated soil cultivation apparatus which is intended to be coupled to the rear of a propelling vehicle and to carry out a number of different soil working operations during forward movement of the apparatus by the vehicle, said apparatus comprising:

a frame;

a coupling arrangement at the forward end of the frame to couple the apparatus to the rear of the propelling vehicle in a fully mounted manner so as to support the forward end of the frame and thereby control the working depth of the apparatus;

a row of transversely extending harrow tines mounted on the frame and extending transversely of the direction of forward travel; and a rotatable soil packer mounted on the frame and having axially spaced packer elements extending generally parallel to the row of harrow tines, said packer being adjustable relative to the frame so that, when engaged with the ground, it controls the height of the rear part of the frame above the ground, and thereby further controls the working depth of the apparatus.

5. Apparatus according to claim 4, including a transversely extending row of seed coulters mounted on the frame rearwardly of the soil packer.

6. An integrated soil cultivation apparatus which is intended to be coupled to the rear of a propelling vehicle and to carry out a number of different soil working operations during forward movement of the apparatus by the vehicle, said apparatus comprising:

a frame;

a coupling arrangement at the forward end of the frame to couple the apparatus to the rear of the propelling vehicle;

a row of transversely extending harrow tines, mounted on the frame;

a set of lowerable transport wheels mounted at the rear of the frame, aid wheels being lowerable into contact with the ground so as to raise the frame and thereby allow the frame to be transported, and said wheels being raised out of contact with the ground when soil working operations are required; and a soil packer mounted in the frame and having axially spaced packer elements extending transversely of the direction of forward travel, said soil packer being engageable with the ground to carry out soil working operations and being adjustable relative tot he frame so that, when engaged with the ground with the transport wheels in the raised position, the packer supports the frame and controls the working depth of the harrow tines.

7. An integrated soil cultivation apparatus which is intended to be coupled to the rear of a propelling vehicle and to carry out a number of different soil-working operations during forward movement of the apparatus by the vehicle, said apparatus comprising:

a frame;

a coupling arrangement at the forward end of the frame to couple the apparatus to the rear of the propelling vehicle;

transversely extending rows of harrow tines mounted on the frame, said rows being spaced apart from each other with respect to the direction of forward travel; and a rotatable soil working device mounted on the fame:

in which one of the rows of harrow tines is mounted on the frame forwardly of said soil-working device, and comprises depth adjustable levelling tines arranged to carry out a preliminary soil-working operation to replace the action normally provided by a known forwardly mounted levelling board.

8. An integrated soil cultivation apparatus which is intended to be coupled to the rear of a propelling vehicle and to carry out a number of different soil-working operations during forward movement of the apparatus by the vehicle, said apparatus comprising:

a main frame, and including an auxiliary frame component which is adjustable relative to the main frame between an operative position, and an upwardly folded transport position;

a coupling arrangement at the forward end of the frame to couple the apparatus to the rear of the propelling vehicle;

harrow tines mounted on the frame;

a seed distribution system mounted on the apparatus and having coulters mounted at the rear of the apparatus and arranged to distribute seed at required depth into a seedbed formed by the soil-working tools of the apparatus; and a seed tank mounted on the frame and being of such a shape and arrangement as to permit folding of said auxiliary frame component to the transport position.

9. Apparatus according to claim 1, in which at least some of the tines are of generally circular cross-section, and include downwardly projecting soil-working fingers.

10. An apparatus according to claim 1, further including:

a forwardly mounted set of levelling tines; and at least one rearmost row of tines mounted at the rear of the frame.

11. Apparatus according to claim 10, in which the rearmost row of tines are incorporated in respective seed distribution coulters.

12. Apparatus according to claim 1, including a row of fertiliser distributor coulters mounted on the frame forwardly of a respective soil packer and a set of seed distribution coulters mounted on the frame rearwardly of said packer.

13. Apparatus according to claim 12, in which the fertiliser distributor coulters are arranged to project more deeply into the ground than the following seed distribution coulters.

* * * * *